United States Patent
Zangi et al.

(10) Patent No.: US 10,120,967 B2
(45) Date of Patent: Nov. 6, 2018

(54) METHODS AND APPARATUSES FOR SW PROGRAMMABLE ADAPTIVE BIAS CONTROL FOR SPEED AND YIELD IMPROVEMENT IN THE NEAR/SUB-THRESHOLD DOMAIN

(71) Applicants: Uzi Zangi, Hod-Hasharon (IL); Neil Feldman, Misgav (IL)

(72) Inventors: Uzi Zangi, Hod-Hasharon (IL); Neil Feldman, Misgav (IL)

(73) Assignee: PLSense Ltd., Yokneam Elit (IL)

( * ) Notice: Subject to any disclaimer, the term of this patent is extended or adjusted under 35 U.S.C. 154(b) by 41 days.

(21) Appl. No.: 14/804,390

(22) Filed: Jul. 21, 2015

(65) Prior Publication Data
US 2016/0283630 A1    Sep. 29, 2016

Related U.S. Application Data

(60) Provisional application No. 62/028,822, filed on Jul. 25, 2014.

(51) Int. Cl.
  *G06F 9/455* (2018.01)
  *G06F 17/50* (2006.01)
  *G01R 31/26* (2014.01)
  *H01L 27/11* (2006.01)

(52) U.S. Cl.
  CPC ..... *G06F 17/5045* (2013.01); *G01R 31/2621* (2013.01); *G06F 2217/78* (2013.01); *H01L 27/1104* (2013.01)

(58) Field of Classification Search
  CPC ............ G06F 17/5045; G06F 2217/78; G01R 31/2621; H01L 27/1104
  See application file for complete search history.

(56) References Cited

U.S. PATENT DOCUMENTS

| | | | | |
|---|---|---|---|---|
| 2008/0086706 | A1* | 4/2008 | Barrows | G06F 17/5063 327/537 |
| 2008/0122524 | A1* | 5/2008 | Barrows | G06F 17/5063 327/537 |
| 2008/0175068 | A1* | 7/2008 | Houston | G11C 5/143 365/185.27 |
| 2008/0191791 | A1* | 8/2008 | Nomura | H03K 19/0008 327/540 |
| 2009/0073782 | A1* | 3/2009 | Hanafi | G11C 29/02 365/189.09 |
| 2010/0002532 | A1* | 1/2010 | Shau | G11C 11/419 365/227 |
| 2012/0062301 | A1* | 3/2012 | Noguchi | H03K 5/133 327/288 |
| 2013/0058177 | A1* | 3/2013 | Seshadri | G11C 29/50 365/201 |
| 2014/0266369 | A1* | 9/2014 | Brunolli | H03K 3/0375 327/211 |

\* cited by examiner

*Primary Examiner* — Nha Nguyen

(57) ABSTRACT

A method for implementing a Semiconductor Integrated Circuit device using Near/Sub-threshold technology with SW programmable adaptive and dynamic forward and reverse bias voltage control using different sensors inside the chip in order to improve speed, reduce leakage and ensure high yield of the final product that operates at an ultra-low power consumption. This method allows achieving ultra-low power solution with reasonable higher speed and insure high yield.

9 Claims, 4 Drawing Sheets inverter structure VT detector

Figure 1 – inverter structure VT detector
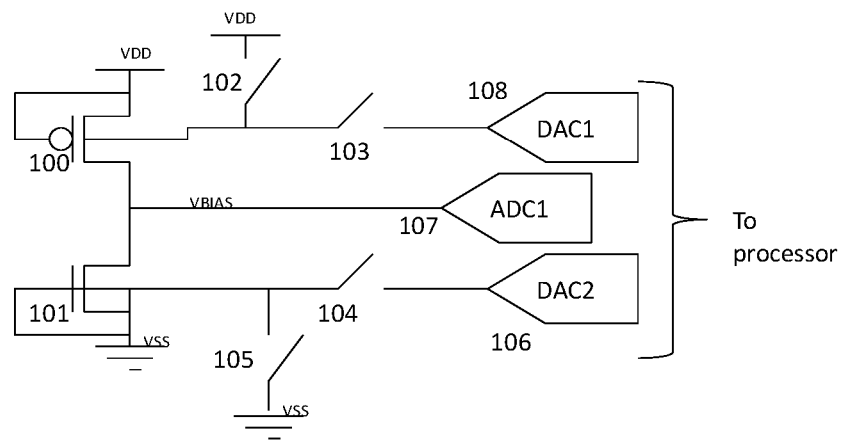
Figure 2 – NAND structure VT detector
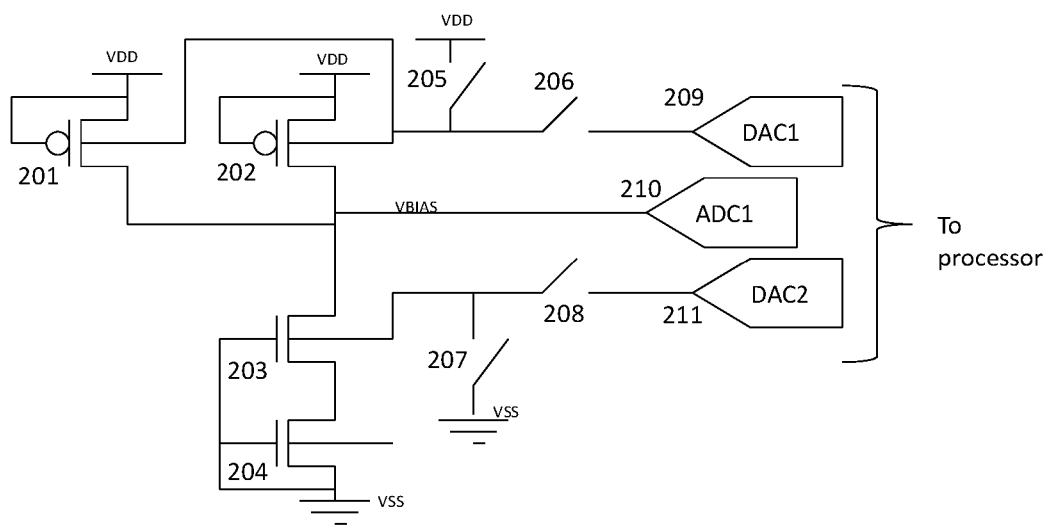

Figure 3 – NOR Structure VT detector
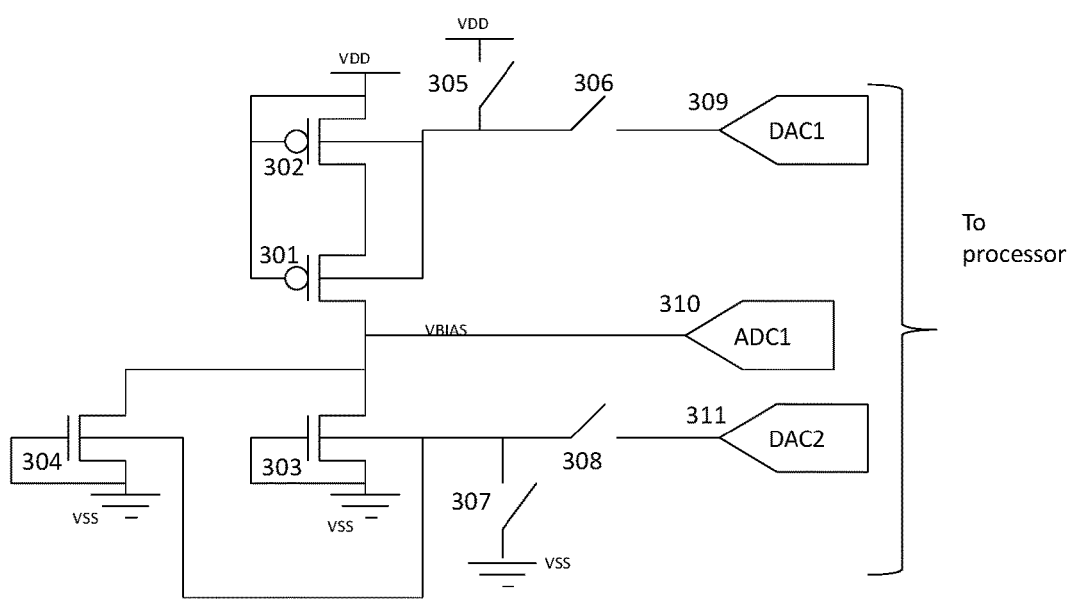

Figure 4 – SW adaptive biasing control algorithm flow chart
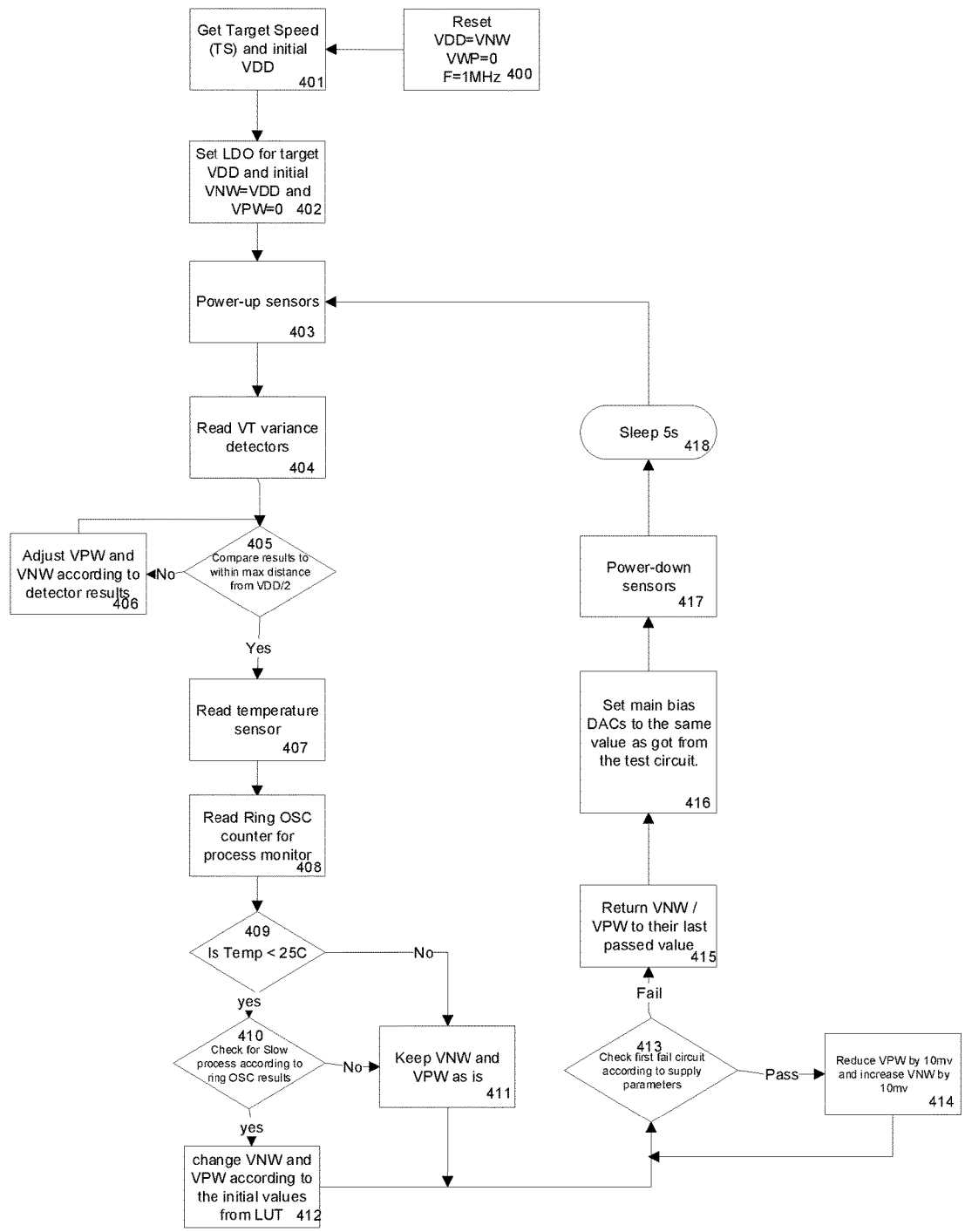

Figure 5 – ASIC chip implementation example using the adaptive bias voltage control mechanism
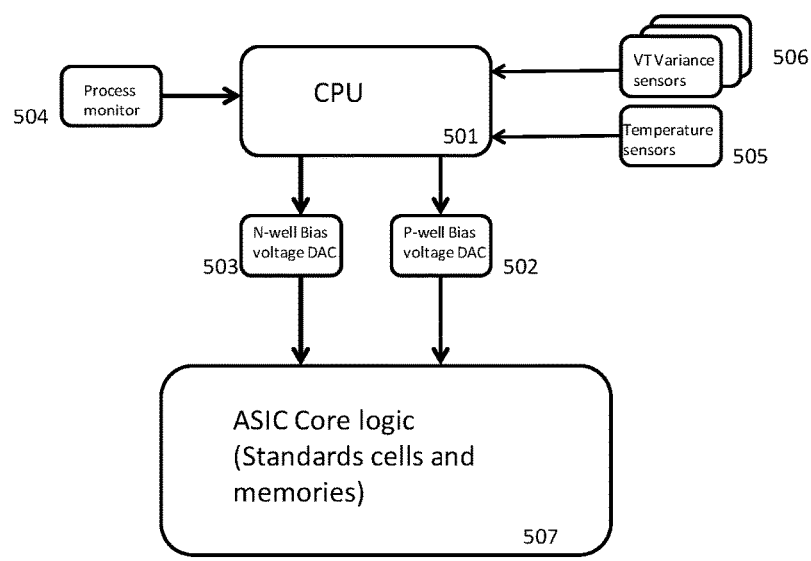

METHODS AND APPARATUSES FOR SW PROGRAMMABLE ADAPTIVE BIAS CONTROL FOR SPEED AND YIELD IMPROVEMENT IN THE NEAR/SUB-THRESHOLD DOMAIN

FIELD

This invention relates generally to the field of design of Semiconductor Integrated Circuit, and more specifically to a Near/Sub-threshold implementation for ultra-low power design flow, based on adaptive dynamic forward and reserve bias voltage control of the silicon transistor.

BACKGROUND

Many new emerging applications require the use of ultra-low power consumption solutions inside a chip. This will allow them to be incorporated into devices that operate from a small non-chargeable battery for very long periods without the need to frequently charge the battery. For example, wearable, mobile devices and IoT (Internet of Things) devices and the like, may require an ultra-low power solution.

Reducing the operating voltage is the most effective method for power reduction and working at the Near/Sub-threshold voltage domain can save 70-80% from the dynamic power consumption and 50-60% from the leakage power. Near/Sub-threshold technology is a way of operating the transistors in their weak inversion state where the transistors are never fully turned on. When operating in the Near/Sub-threshold region, the transistor state varies between being fully turned off and partially turned on.

When operating in the Near/Sub-threshold region, transistors operate at a near or lower voltage than their threshold voltage (known as VT) and by such operation the transistor uses less power. During Near/Sub-threshold voltage operation, both dynamic power (which is caused by a logic change) and static power (which is consume all the time) are reduced. Dynamic power is a ratio of the operating voltage by a power of two, and static power is a ratio of the operating voltage, therefore reducing the operating voltage of the device to a Near/Sub-threshold voltage level will reduce power dramatically (in the range of 3-5× then a comparable solution working at standard voltage).

One of the major limiting factors for using Near/Sub-threshold technology is the low performance of the transistors at a very low voltage and due to this limitation the usage of Near/Sub-threshold technology in commercial chips is very limited.

The second limiting factor is the low yield problem for chips which are working at the Near/Sub-threshold domain due to the VT variation between the P-ch and N-ch transistors which increases when the voltage goes down.

Various methods and implementations for the Near/Sub-threshold technology exist today, those methods focus only on power reduction and not on the optimal way to use this technology for a given power per performance required by a specific application or how to improve the final product yield.

There is still a need for Near/Sub Threshold technology methods which optimizes power consumption while still meeting the performance requirements for a specific product or application and also ensures high yield for high volume production parts.

DETAILED DESCRIPTION

This invention relates to a Near/Sub Threshold technology and especially to a Near/Sub Threshold implementation for ultra-low power design flow, based on adaptive dynamic forward and reverse bias voltage control of the silicon transistor.

This method allows an ultra-low power design flow usage of Near/Sub-threshold technology to achieve reasonable speed needed in commercial chips. The fact that the forward and reverse bias voltage control is done dynamically and adaptively upon sampling different silicon parameters gives the ability to do a tradeoff between speed and power consumption (mainly for the leakage power) and then there is no need to design the silicon to work always at the extreme silicon conditions which practically almost never happen (in these conditions the chip will still work but will require higher forward biasing than other silicon corners)

The advantage of this invention is to increase the operating speed whilst working in the Near/Sub Threshold voltage domain. This invention may be used by any system which requires low processing power with ultra-low power consumption.

This invention relates to a method for implementing a Semiconductor Integrated Circuit device using a Near/Sub-threshold technology with SW programmable adaptive forward and reverse biasing control using different sensors inside the chip in order to improve speed, reduce leakage and insure high yield of the final product that operates at near or sub threshold voltage domain. This method allows achieving ultra-low power solution with reasonable higher speed and insure high yield.

The 3 main components of the invention are the sensors which are built inside the silicon and sample different parameters, the DAC's that can control and change on the fly the bias voltage of the N-ch and P-ch transistors and the SW algorithm which can sample the different sensors and by running a unique algorithm can control via the DAC's the bias voltage of the N-ch and P-ch transistors.

This invention may be used by any system which requires low processing power with ultra-low power consumption.

This invention has been described as including various operations. Many of the processes are described in their most basic form, but operations can be added to or deleted from any of the processes without departing from the scope of the invention.

For one embodiment of the invention, a Near/Sub Threshold technology flow implementation is provided that optimizes power for a given performance requirement of a known application by optimizing adaptively and dynamically the N-ch/P-ch transistor bias per a giving process, temperature and VT variance.

Another embodiments of the invention includes implementation and characterization of a library that is optimized for use at Near/Sub-threshold voltage levels, and that can support adaptive transistor forward and reverse bias change on the fly by changing the N-Well and P-Well bias voltages.

Another embodiments of the invention includes implementation of a place and route (P&R) flow that concurrently supports two different power meshes one for the operating voltage and ground voltage and the other for the N-Well and P-Well voltages.

Another embodiments of the invention may include one or more special sensors inside the chip for checking performance, temperature and VT variations monitoring.

The above sensors can be generic sensors which are used typically in different silicon implementations like temperature, process monitors and so on, and other more unique sensors which are built specifically for the use of the adaptive dynamic forward and reverse bias voltage control like the VT variance sensors.

Additionally, embodiments of the invention may also include a method for selecting optimal forward and reverse bias voltage levels using the different sensors inside the chip and SW algorithm that controls the forward and reverse bias voltage using the 2 DAC's inside the silicon in order to achieve the optimal power per performance.

Additionally, embodiments also include a SW programmable method to do VT balancing between different transistor types (N-ch and P-ch) and different cell structures in order to improve the final yield.

For one embodiment of the invention, the implementation may be affected using SW control on the N-well and P-well forward and reverse bias voltage to improve transistor speed and reduce the leakage power. By increasing the N-ch P-well or decreasing the P-ch N-well voltages the VT of the N-ch or P-ch transistor decreases and increases the operational speed exponentially without impacting the dynamic power. In case the forward bias is used the only impact will be on the leakage current. As this method is used only while the temperature is low (the silicon performance is slow at low temperature and high at high temperature when working at the Near/Sub Threshold voltage domain) the impact on the leakage current is very low (only a few percentage). In case the reverse bias is used the leakage power is reduced but also the operating speed is reduced. This option is used only at high temperatures where the speed performance of the silicon is high but also the leakage is high. Using this unique invention, we can optimize power whilst still operating at the required speed.

For this invention, the decision on the correct bias voltage for the N-ch P-well and the P-ch N-well is done using process, temperature monitors and VT variance sensors which exist inside the silicon (split inside the silicon in different places and repeated few times based on the silicon die size, for large dies there will be more sensors) and a SW algorithm that uses these measurements to decide the best optimum bias voltage to use.

In this invention, a few different structures of sensors for N-ch and P-ch VT variations are used in order to understand the variance between the VT of these two transistor types which changes according to the different process and temperature. After the variance is sampled a SW algorithm decides what is the right N-well is and P-well bias voltage to use in order to adjust the VT variance between these two transistors. The decision is made together with the process and temperature sensing in order to give the best optimal bias voltage for both speed, leakage and VT variance. By doing this the main problem of low yield in Near/Sub-threshold voltage is also improved.

BRIEF DESCRIPTION OF THE DRAWINGS

The invention may be understood by referring to the following description and accompanying drawings that are used to illustrate embodiments of the invention. In the drawings:

FIG. 1 illustrates a schematic of the VT balancing circuit used to sense the change between the N-ch and P-ch transistors VT inside an inverter structure;

FIG. 2 illustrates a schematic of the VT balancing circuit used to sense the change between the N-ch and P-ch transistors VT inside a NAND structure;

FIG. 3 illustrates a schematic of the VT balancing circuit used to sense the change between the N-ch and P-ch transistors VT inside a NOR structure;

FIG. 4 illustrates the SW flow chart which is used to make a decision on the optimal bias voltage to be used per the different N-Well and P-Well voltages according to the inputs from the different sensors and the target speed.

FIG. 5 illustrates a silicon example which is using the above sensors, the bias control DAC's and the CPU which runs the SW algorithm to close the loop between the sensors and the DAC's control.

DETAILED DESCRIPTION OF THE DRAWINGS

In the following description, numerous specific details are set forth. However, it is understood that embodiments of the invention may be practiced without these specific details. In other instances, well-known circuits, structures and techniques have not been shown in detail in order not to obscure the understanding of this description. Furthermore, the particular features, structures, or characteristics of this invention may be combined in any suitable manner in one or more embodiments.

FIG. 1 illustrates an exemplary circuit which is used to detect the VT variance between the N-ch and P-ch transistor inside an inverter structure. As shown in FIG. 1 transistors 101 is N-ch transistor that is connected between VSS and transistor 100 which is P-ch transistor that is connected between VDD and transistor 101. Transistor 101 gate input is connected to VSS and transistor 100 gate input is connected to VDD, which means both transistors are closed, and the Vbias point is at a floating state and is set according to the in-balance of transistors 100 and 101 VT value (this way the CPU can detect the difference between the two transistors type VT level). The voltage on Vbias can be sampled by the CPU via ADC1 (107 in FIG. 1). The N-well and P-well voltages for the P-ch and N-ch transistors can be controlled from the CPU using DAC1 (108 in FIG. 1) for the N-well and DAC2 (106 in FIG. 1 for the P-well as shown in FIG. 1. The N-well and P-well voltages can get also their default value by using the different switches which can be control through the CPU. When switch 102 is closed and switch 103 is open the N-well voltage equal to VDD and isn't controlled through the CPU but when switch 102 is open and switch 103 is closed the CPU controls the N-well voltage. The same operation is applied also to the P-well voltage and control using the switch's 104 and 105 in FIG. 1. In this method the CPU can first measure the VT in-balance whilst the wells are connected to VDD and VSS and then measure the VT in-balance when the wells are biased by different voltages and optimize the in-balance.

FIG. 2 illustrates an exemplary circuit which is used to detect the VT variance between the N-ch and P-ch transistor inside a NAND structure. As shown in FIG. 2 transistors 203 and transistors 204 are N-ch transistors that are connected in series between VSS and transistors 201/202. Transistors 201/202 are P-ch transistors that are connected between VDD and transistors 203/204 in parallel. Transistors 203/204 gate input is connected to VSS and transistors 201/202 gate input is connected to VDD which means all transistors are closed and the Vbias point is at floating state and is set according to the in-balance of transistors 201/202 and transistors 203/204 VT levels. The voltage on Vbias point can be sampled by the CPU via ADC1 (210 in FIG. 2). The N-well and P-well voltages for the P-ch and N-ch transistors can be controlled from the CPU using DAC1 (209 in FIG. 2) for the N-well and DAC2 (211 in FIG. 2) for the P-well as shown in FIG. 2. The N-well and P-well voltages can get also their default value by using the different switches in FIG. 2 which can be control through the CPU (the same way as in FIG. 1).

FIG. 3 illustrates an exemplary circuit which is used to detect the VT variance between the N-ch and P-ch transistors inside a NOR structure. As shown in FIG. 3 transistors 303 and 704 are N-ch transistors that are connected in parallel between VSS and transistors 301/302. Transistors 301/302 are P-ch transistors that are connected between VDD and transistors 303/304 in series. Transistors 303/304 gate input is connected to VSS and transistors 301/302 gate input is connected to VDD which means all transistors are closed and the Vbias point is at floating state and is set according to the in-balance of transistors 301/302 and transistors 303/304 VT. The voltage on the Vbias point can be sampled by the CPU via ADC1 (310 in FIG. 3). The N-well and P-well voltages for the P-ch and N-ch transistors can be controlled from the CPU using DAC1 (309 in FIG. 3) for the N-well and DAC2 (311 in FIG. 3) for the P-well as shown in FIG. 3. The N-well and P-well voltages can get also their default value by using the different switches in FIG. 3 which can be controlled through the CPU. (the same way as in FIG. 1).

FIG. 4 illustrates an adaptive bias voltage control flow chart method in accordance with one embodiment of the invention. The process shown in FIG. 4 begins with reset of the CPU (box 400 in FIG. 4) which wake-up at nominal bias voltage and slow speed. The CPU get the target speed and initial operating voltages VDD (box 401 in FIG. 4). Then the CPU sets on the test circuit only to the target operating voltage that was received before and initial values for bias voltage of N-Well equals to VDD and P-Well equals to ground (0) (box 402 in FIG. 4). Then the CPU powers-up the different sensors inside the chip (box 403 in FIG. 4) and reads the VT variance sensor (box 404 in FIG. 4). The CPU checks if the VT variance circuit output is equal to VDD/2 (box 405 in FIG. 4) and if not change the value of the N-Well and P-Well voltages accordingly until he gets the VT sensor output to be equal to VDD/2 (box 406 in FIG. 4). The CPU reads the temperature sensor value (box 407 in FIG. 4) and checks the process monitor sensor using the ring oscillator (box 408 in FIG. 4). The CPU checks if the temperature is lower than 25 C (box 409 in FIG. 4), if it's not then it keeps the N-Well and P-Well voltages as is (box 411 in FIG. 4) and jump to check the first fail circuit status. If the temperature is less than 25 C the CPU checks the process according to the results from the ring oscillator counter (box 410 in FIG. 4), if the process isn't a slow process then the CPU keeps the N-Well and P-Well voltages as is (box 411 in FIG. 4) and jump to check the first fail circuit status. If the temperature is less than 25 C and the process is slow the CPU change the N-well and P-well voltages according to the initial value he got from the LUT (box 412 in FIG. 4). Then the CPU checks the status of the first fail circuit (box 413 in FIG. 4) and if the test pass the CPU try to reduce the value of the P-Well (VPW) bias voltages by 10 mv and increase the value of the N-Well (VNW) by 10 mv (box 414 in FIG. 4) until the test of the first fail circuit fails, when the test fail the CPU return the values of the N-Well and P-Well voltages to what they were one step before (box 415 in FIG. 4) and continue with the flow. Then the CPU sets the main chip bias DACs to the value he found before using the test circuit (box 416 in FIG. 4) and then power-down the sensors (box 417 in FIG. 4), goes to sleep for 5 sec (box 418 in FIG. 4) and then returns to the sensors power-on stage (box 403 in FIG. 4) to check all procedure again.

An implementation example can be seen on FIG. 5 which includes the following components: 1) A single temperature sensor (box 505 in FIG. 5). 2) A single ring oscillator for process monitor (box 504 in FIG. 5). 3) 3 types of VT mismatch circuits which check the VT variance between the N-ch and P-ch transistors in different structures. These sensors are repeated inside the chip at certain distances to be able to measure and compensate for silicon variances in different places on the die (box 506 in FIG. 5). 4) 2 DAC's whose output can be controlled by the SW and their output is driving the P-Well (box 502 in FIG. 5) and N-Well (box 503 in FIG. 5) bias voltage of the N-ch and P-ch transistors respectively inside the ASIC (box 507 in FIG. 5). 5) A CPU which can read the different sensors and control the output of the bias voltage DAC's (box 501 in FIG. 5). On the processor there is a special SW algorithm (as seen in FIG. 4) which determines the value of the DAC's after reading the value of the sensors.

What is claimed is:

1. A Semiconductor Integrated Circuit device, comprises one or more sensors located in the device configured to collect information about the device;
   a computerized software configured to:
      receive target speed and initial operating voltages;
      read a temperature sensor output and a process monitor output;
      check if a VT variance circuit output equals to VDD/2; if not, gradually change the value of the N-Well and P-Well voltages until a VT sensor output equals VDD/2;
      set a first fail circuit to a target operating voltage and initial values for bias voltage of N-Well and P-Well;
      check the status of a first fail circuit, if the test passes, gradually reduce a value of the P-Well (VPW) bias voltages and increasing a value of the N-Well (VNW) until the test of the first fail circuit fails;
      returning the last values of the N-Well and P-Well voltages before the first fail circuit failed;
      based on the temperature sensor output, a process monitor output and a VT variance monitor output, output a command to change bias forward and reverse voltage for the N-ch and P-ch transistors inside standard cell and static random access memory (SRAM) implementation;
   digital-to-analog converters (DACs) connected to the N-ch and P-ch transistors, said DACs are configured to adjust forward and reverse biasing according to the command from the software;
   wherein adjusting the forward and reverse biasing is performed during use of the transistors.

2. The device of claim 1, wherein the Semiconductor Integrated Circuit device includes one or more logic cells or/and SRAM cells, where part or all of these cells are designed to work at an adaptive and dynamic change of the forward and reverse bias voltage.

3. The device of claim 2, wherein the DACs are configured to control and adjust dynamically the N-Well and P-Well bias voltages of the different N-ch and P-ch transistor according to the software algorithm.

4. The device of claim 1, wherein the number and structure of the one or more sensors depends on the size of the silicon and Near or Sub Threshold library implementation.

5. The device of claim 4, wherein the sensors are read by the integrated or external CPU.

6. The device of claim 1, wherein at least one of the one or more sensors is an environmental sensor.

7. A method of regulating bias forward and reverse voltage of a Semiconductor Integrated Circuit device, comprising: receiving target speed and initial operating voltages; reading a temperature sensor output and a process monitor output; checking if a VT variance circuit output equals to VDD/2; if not, gradually changing the value of the N-Well and P-Well voltages until a VT sensor output equals VDD/2; setting a first fail circuit to a target operating voltage and initial values for bias voltage of N-Well and P-Well; checking the status of a first fail circuit, if the test passes, gradually reducing a value of the P-Well (VPW) bias voltages and increasing a value of the N-Well (VNW) until the test of the first fail circuit fails and returning the last values of the N-Well and P-Well voltages before the first fail circuit failed; combining inputs from multiple sensors located inside the device, and based on the inputs, adaptively and dynamically adjusting forward and reverse biasing of N-ch P-Well and P-ch N-Well transistors, wherein changing VT variant circuit output using on chip digital-to-analog converters (DACs), wherein the method is implemented on the fly using software that receives the inputs from the multiple sensors and output a command to the DACs, said DACs adjust the forward and reverse biasing according to the command from the software, wherein the method is performed during use of the transistors.

8. The method of claim 7 wherein these VT variance sensors include structures, selected from a group consisting an Inverter, NAND and NOR structures.

9. The method of claim 7, further comprises performing VT balancing between different transistor types (N-ch and P-ch) and different cell structures.

* * * * *